United States Patent
Ligi et al.

(10) Patent No.: US 10,421,379 B2
(45) Date of Patent: Sep. 24, 2019

(54) ADJUSTABLE ARMREST

(71) Applicant: FORD GLOBAL TECHNOLOGIES, LLC, Dearborn, MI (US)

(72) Inventors: Anthony Ligi, Chelsea, MI (US); Scott Simon, Dexter, MI (US); Thomas William Pietila, Brighton, MI (US); Chad M. Bross, Pickney, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 11 days.

(21) Appl. No.: 15/085,063

(22) Filed: Mar. 30, 2016

(65) Prior Publication Data

US 2017/0282760 A1 Oct. 5, 2017

(51) Int. Cl.
B60N 2/75 (2018.01)

(52) U.S. Cl.
CPC .............. *B60N 2/767* (2018.02); *B60N 2/75* (2018.02); *B60N 2/77* (2018.02); *B60N 2/78* (2018.02)

(58) Field of Classification Search
CPC ...... B60N 2/464; B60N 2/466; B60N 2/4633; B60N 2/767; B60N 2/75; B60N 2/77; B60N 2/78
USPC ........ 296/24.34, 37.8, 153; 297/411.36, 115, 297/188.16, 188.19, 188.14
See application file for complete search history.

(56) References Cited

U.S. PATENT DOCUMENTS

| | | | | |
|---|---|---|---|---|
| 4,244,623 A | * | 1/1981 | Hall | A47C 1/03 297/115 |
| 4,311,338 A | * | 1/1982 | Moorhouse | A47C 1/03 248/281.11 |
| 4,674,790 A | * | 6/1987 | Johnson | B60N 2/4626 248/118 |
| 6,003,927 A | * | 12/1999 | Korber | B60N 2/464 296/37.8 |
| 9,058,052 B2 | | 6/2015 | Bruns et al. | |

FOREIGN PATENT DOCUMENTS

| | | | |
|---|---|---|---|
| CN | 201604556 U | 10/2010 | |
| DE | 10206195 A1 | 9/2003 | |
| DE | 10236129 A1 | 2/2004 | |
| FR | 2841511 A1 * | 1/2004 | ............... B60N 2/77 |
| FR | 2841511 A1 | 1/2004 | |
| KR | 20090001170 U | 2/2009 | |

OTHER PUBLICATIONS

English Machine Translation of CN201604556U.
English Machine Translation of DE10206195A1.
(Continued)

*Primary Examiner* — Joseph D. Pape
*Assistant Examiner* — Dana D Ivey
(74) *Attorney, Agent, or Firm* — Vichit Chea; King & Schickli PLLC

(57) ABSTRACT

An armrest for a vehicle includes an armrest element and a floating support assembly configured for selectively pivoting the armrest element in a vehicle-fore and -aft motion. The floating support assembly includes at least one vertically translatable support arm pivotally attached to the armrest element. The at least one vertically translatable support arm may be operatively supported by a resilient member.

15 Claims, 4 Drawing Sheets

(56) References Cited

OTHER PUBLICATIONS

English Machine Translation of DE10236129A1.
English Machine Translation of FR2841511A1.
English Machine Translation of KR20090001170U.
"Quick Stops—Keyless Entry System with Immobilizer"; Subaru of America, Inc.; http://drive2.subaru.com/Sum04_QuickStops.htm; Summer 2004; pp. 1-3.
Audi Q5 Brochure; Audi of India Division of Volkswagen Group Sales India Private Limited; www.audi.in/content/dam/ngw/sea/in/pdf/new-brochures/Audi%20Q5_Brochure.pdf; pp. 1-56.

* cited by examiner

ADJUSTABLE ARMREST

TECHNICAL FIELD

This document relates generally to the motor vehicle equipment field and, more particularly, to an adjustable armrest and to a motor vehicle including such an adjustable armrest.

BACKGROUND

Occupants in a motor vehicle are typically provided one or more armrests, providing a platform to rest a portion of the occupant's arm while operating or riding in the vehicle. Typically at least exterior armrests are provided, most often armrests disposed on or near a vehicle door. In left-hand drive vehicles the occupants of the driver's side of the vehicle have at least a left-hand armrest and the occupants of the passenger's side of the vehicle have at least a right-hand armrest. This configuration is reversed in right-hand drive vehicles.

It is also known to provide interior armrests, often associated with the vehicle seat or with a center console. Interior armrests are most typically associated with vehicles automatic transmissions. This is because for vehicles equipped with manual transmissions and especially for manual transmission drive vehicles equipped with gearshift levers, the driver requires a certain degree of mobility for the arm used to actuate the gearshift lever which is usually disposed centrally in the vehicle, such as on or near a center console, on the steering wheel column, etc. Conventional fixed armrest structures are too large and do not allow any degree of adjustment to allow use by the driver but also to provide the necessary flexibility and range of driver arm motion needed to operate the manual transmission gearshift lever.

In order to rectify this situation, a need is identified for an armrest for a motor vehicle that allows a range of adjustments to accommodate a drivers arm while actuating a manual transmission gearshift lever, as well as for a motor vehicle seat and motor vehicle including such an armrest.

SUMMARY

In accordance with the purposes and benefits described herein, in one aspect, an armrest for a vehicle is described comprising an armrest element and a floating support assembly. The floating support assembly is configured for selectively pivoting the armrest element in a vehicle-fore and -aft motion by way of at least one vertically translatable support arm pivotally attached to the armrest element. In embodiments, the floating support includes a pair of independently vertically translatable support arms.

In embodiments, the at least one vertically translatable support arm is operatively supported by a resilient member and includes at least one retaining notch. In embodiments, the at least one vertically translatable support arm includes a plurality of vertically stacked retaining notches. The assembly further may include a retainer configured to releasably engage the plurality of vertically stacked notches to maintain a particular preferred support arm vertical position. The armrest assembly may be configured to be associated with one of a vehicle seat, a vehicle passenger cabin floor, or a vehicle center console.

In another aspect, a vehicle center console assembly is described, comprising a center console and an armrest assembly as described above.

In the following description, there are shown and described several preferred embodiments of the described adjustable armrest. As it should be realized, the armrest is capable of other, different embodiments and its several details are capable of modification in various, obvious aspects all without departing from the armrest as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the adjustable armrest and together with the description serve to explain certain principles thereof. In the drawing figures.

Reference will now be made in detail to the present preferred embodiments of the described armrest, examples of which are illustrated in the accompanying drawing figures.

DETAILED DESCRIPTION

Preliminarily, the present disclosure primarily describes an adjustable armrest associated with a center console of a manual transmission-equipped vehicle including a manual transmission gearshift lever. However, the skilled artisan will appreciate from the disclosure that the described system is readily adaptable to other vehicle types such as automatic transmission-equipped vehicles, manual transmission-equipped vehicles including steering wheel-mounted shifting paddles, and others. Further, the described armrest could easily be mounted to a center console, to a vehicle seat structure, to a passenger cabin floor, or others. Accordingly, the descriptions and drawings that follow will not be taken as limiting in regard to the above-described features.

Figure 1:
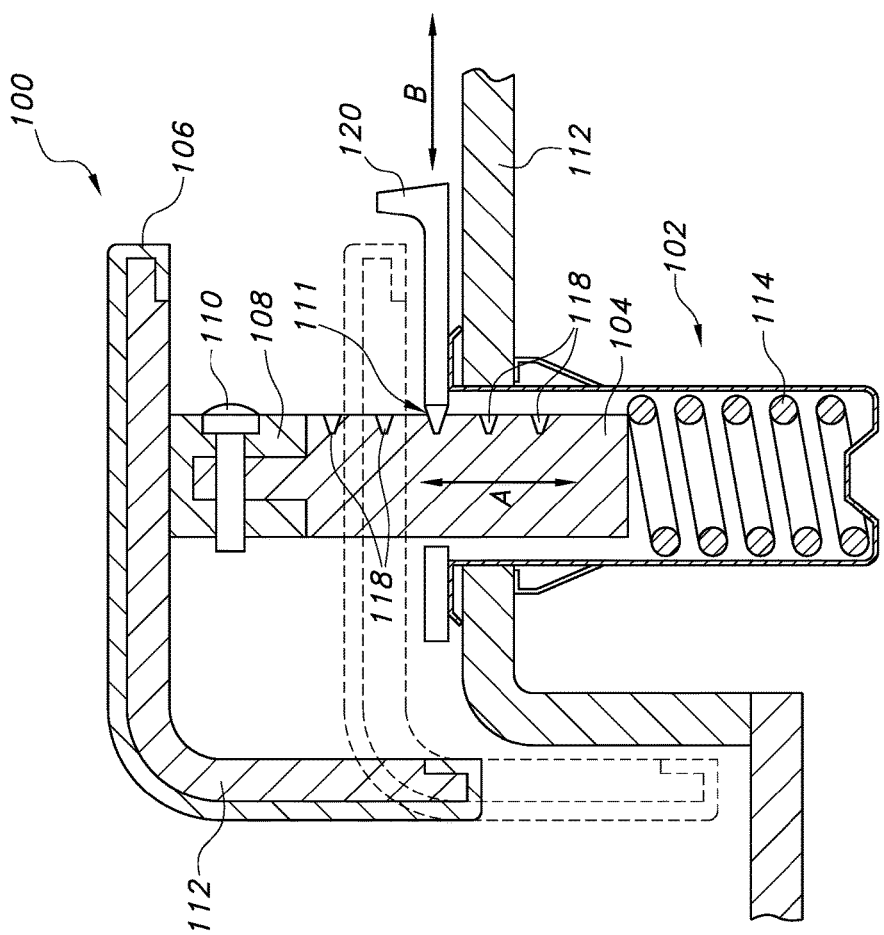
FIG. 1 is a cross sectional view of an armrest assembly according to the present disclosure.

Reference is now made to FIG. 1 illustrating an armrest assembly 100 for a motor vehicle. The armrest assembly 100 includes a floating support assembly 102 comprising at least one vertically translatable (arrows A) support arm 104 pivotally connected to an armrest element 106. In the depicted embodiment, the support arm 104 is pivotally connected to the armrest element 106 by way of a U-bracket 108 and cooperating pin 110, although any suitable pivoting connection is contemplated. In the depicted embodiment the at least one vertically translatable support arm 104 is slidingly disposed in a recess, sheath, or slot 111 disposed in a vehicle center console assembly 112.

By the term "floating" support assembly 102, it is meant that the at least one vertically translatable support arm 104 is configured to selectively vertically translate the armrest element 106 to provide a fore-and-aft pivoting motion of the armrest element. As will be appreciated, this allows adjustment of an angle at which the armrest element 106 is held, to improve user comfort.

In one embodiment, this is accomplished by operatively supporting the at least one vertically translatable support arm 104 pivotally by a resilient member 114. In the depicted embodiment the resilient member 114 is a coil spring disposed below the at least one vertically translatable support arm to allow a selective up-and-down motion of the support arm and thereby of a portion of the armrest element 106. However, it will be appreciated that use of any suitable resilient member is contemplated.

Figure 2:
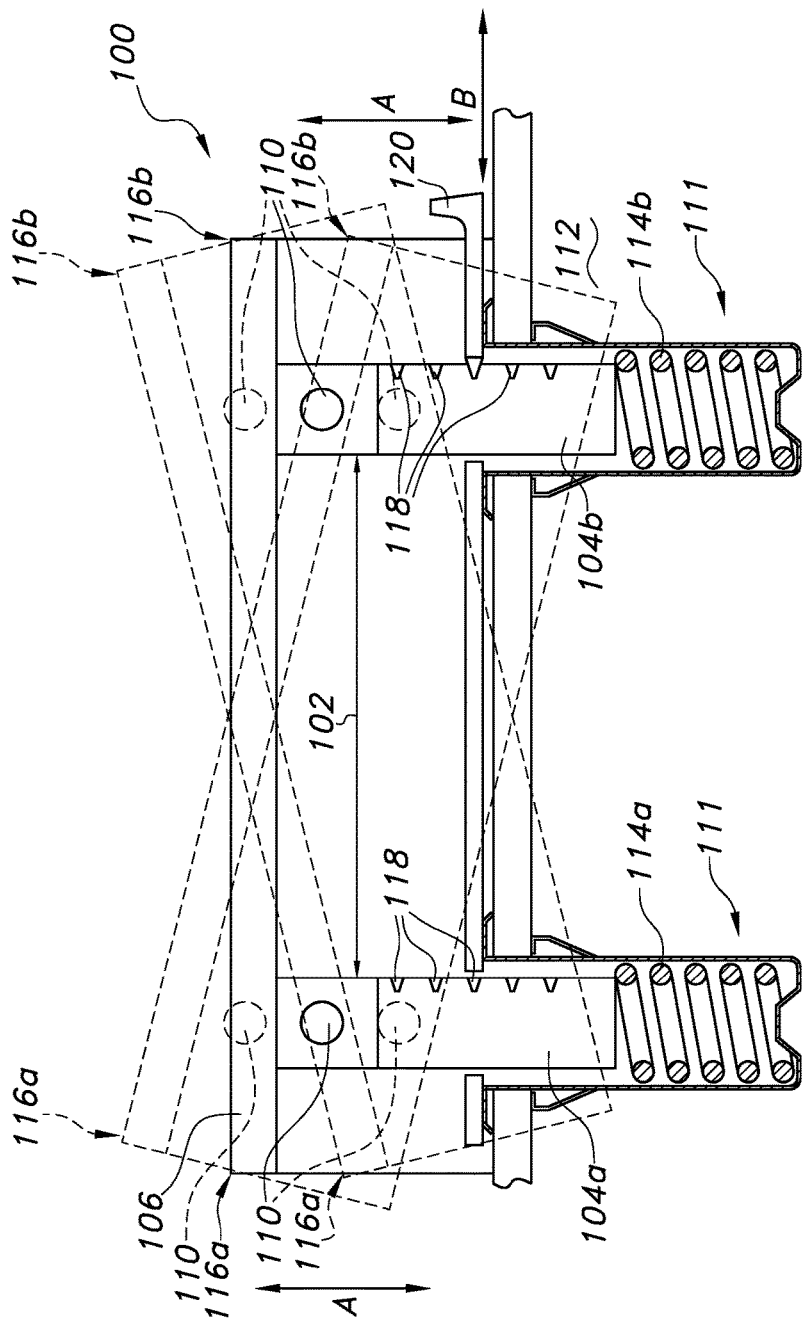
FIG. 2 is a side view of the armrest assembly of FIG. 1.

In an embodiment as shown in FIG. 2, the floating support assembly 102 comprises a pair of vertically translatable support arms 104a, 104b each operatively supported by a resilient member 114a, 114b. As will be appreciated, this arrangement allows vertical translation of a fore portion 116a and an aft portion 116b of the armrest element 106 (see arrows A) independently of one another, allowing a pivoting or rocking motion of the armrest element. By this configuration, a fore- and aft-(relative to a longitudinal orientation of the armrest element 106 and of the vehicle) may be adjusted as desired. Indeed, by the described mechanism the armrest element 106 may be allowed to simply "float" to accommodate a changing fore-and-aft angle of a user's arm (not shown).

Advantageously, the floating support assembly 102 may also be provided with a retainer mechanism to allow a particular desired fore-and-aft angle of the armrest element 106 to be established according to user preference and then fixed in place. In an embodiment, as shown in FIGS. 1 and 2 this is provided by one or more retaining notches 118 defined in a vertically stacked configuration in the vertically translatable support arm 104. A translatable (arrows B) retainer 120 is provided, configured to releasably engage the vertically stacked retaining notches 118. Similar arrangements are known for controlling displacement and height of, for example, adjustable vehicle seat headrests.

As will be appreciated, once a fore and/or aft portion 116a, 116b of the armrest element 106 has been translated to a desired height to provide the desired angle for the armrest element, the retainer 120 may be translated to engage a retaining notch 118. As will also be appreciated, the specific number of retaining notches 118 may be altered as needed to provide the desired range of motion of a support arm 104.

It will be appreciated that use of any suitable retainer mechanism is contemplated, including without intending any limitation constant-force, ratcheting, and friction mechanisms. For example, use of tape spring mechanisms, ratcheting lock/latch mechanisms, and camming lock/latch mechanisms is contemplated.

Figure 3A:
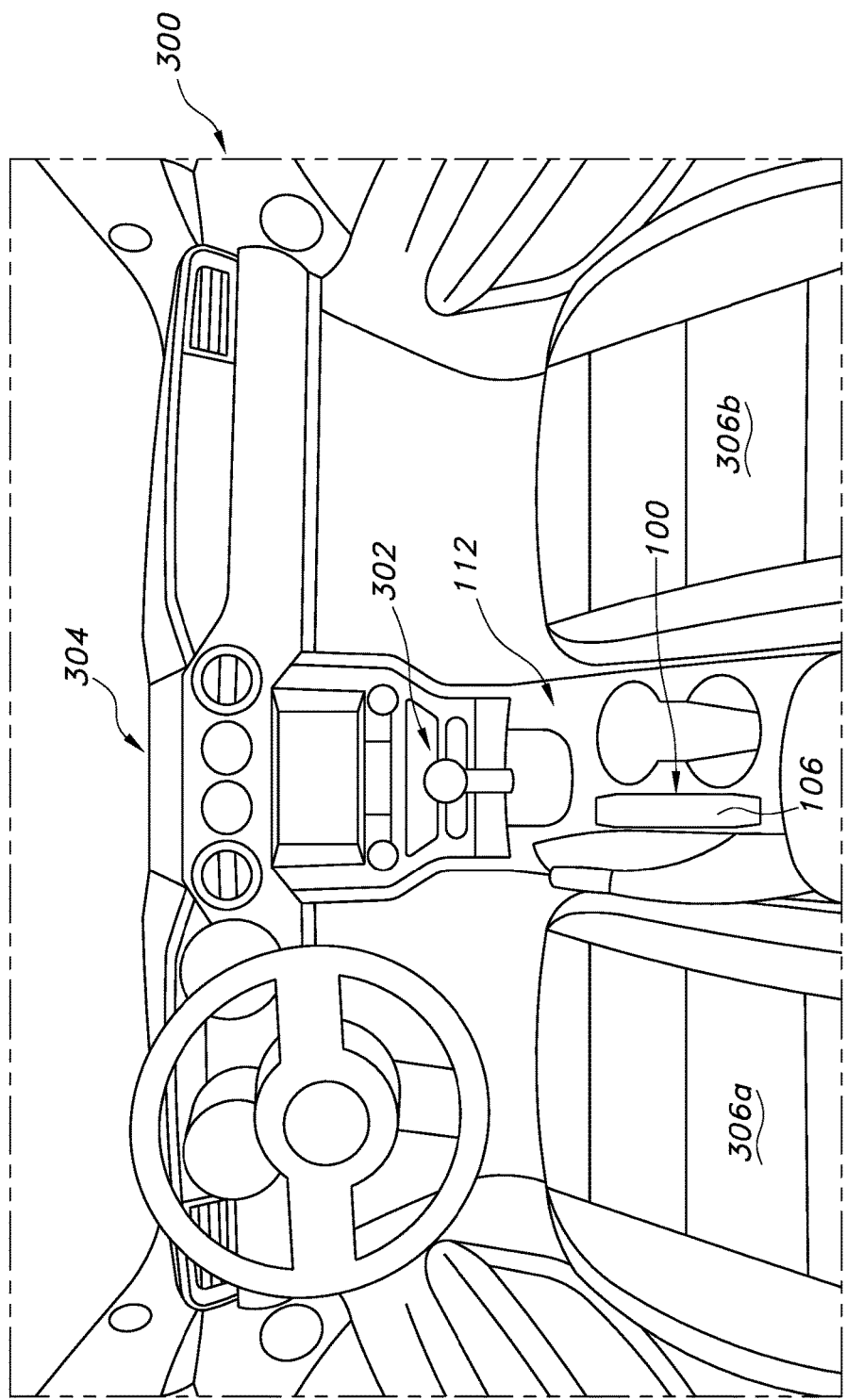
FIG. 3A shows the armrest assembly of FIG. 1 associated with a vehicle center console.

The advantages of the described armrest assembly 100 are apparent, allowing a range of adjustability of the armrest element 106 as described above for user comfort. In one particular embodiment (see FIG. 3A), the armrest assembly 100 is associated with by a center console 112 of a vehicle 300. In the depicted embodiment, the vehicle 300 is a manual transmission drive vehicle including a manual transmission gearshift lever 302 also associated with the center console 112, and near a vehicle instrument panel 304. The center console 112 is disposed between the vehicle front seat assemblies 306a, 306b. Thus, by the floating and adjustable armrest assembly 100 as described, the vehicle 300 driver (not shown) is able to utilize the armrest element 106 not only for convenience and comfort, but also positioned at a suitable fore-and-aft angle to allow comfortable and safe operation of the gearshift lever 302.

Figure 3B:
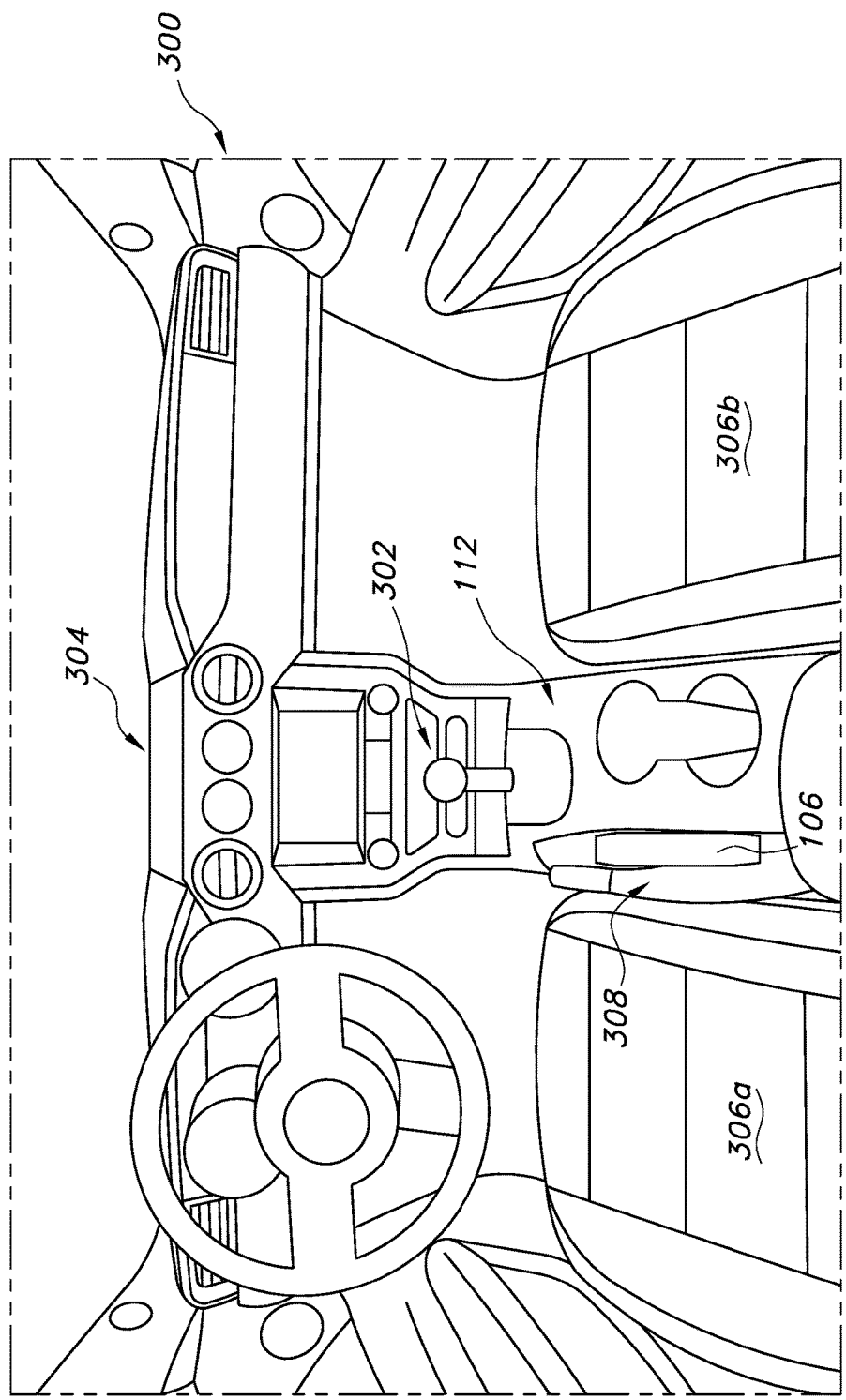
FIG. 3B shows an alternative embodiment of the armrest assembly of FIG. 3A.

The foregoing has been presented for purposes of illustration and description. It is not intended to be exhaustive or to limit the embodiments to the precise form disclosed. Obvious modifications and variations are possible in light of the above teachings. For example, alternative placements of the armrest assembly 100 are contemplated. For example, as shown in FIG. 3B the assembly 100 could be disposed adjacent to the center console 112, for example associated with one of the driver's side seat assembly 306a or with a floor 308 of the vehicle 300 passenger cabin. Still further, in a vehicle without a center console but with a center gearshift lever, the armrest assembly 100 could be associated with a portion of the passenger cabin floor normally occupied by a center console (embodiment not shown).

All such modifications and variations are within the scope of the appended claims when interpreted in accordance with the breadth to which they are fairly, legally and equitably entitled.

What is claimed:

1. An armrest assembly for a vehicle, comprising:
   an armrest element; and
   a floating support assembly configured for selectively pivoting the armrest element, the floating support assembly including two vertically translatable support arms each respectively pivotally attached to an opposed end of the armrest element each including at least one retaining notch.

2. The armrest assembly of claim 1, wherein the two vertically translatable support arms are operatively supported by a resilient member.

3. The armrest assembly of claim 1, wherein the two vertically translatable support arms each include a plurality of vertically stacked retaining notches.

4. The armrest assembly of claim 3, further including a retainer configured to releasably engage the plurality of vertically stacked retaining notches of at least one of the two vertically translatable support arms.

5. The armrest assembly of claim 1, associated with one of a vehicle seat, a vehicle passenger cabin floor, or a vehicle center console.

6. An armrest assembly for a vehicle, comprising:
   an armrest element; and
   a pair of independently vertically translatable support arms each respectively pivotally attached to a fore and an aft portion of the armrest element and each including a plurality of retaining notches.

7. The armrest assembly of claim 6, wherein each of the pair of vertically translatable support arms is independently operatively supported by a resilient member.

8. The armrest assembly of claim 6, wherein the pair of vertically translatable support arms each include a plurality of vertically stacked retaining notches.

9. The armrest assembly of claim 8, wherein at least one of the pair of vertically translatable support arms further includes a retainer configured to releasably engage the plurality of vertically stacked retaining notches.

10. The armrest assembly of claim 6, associated with one of a vehicle seat, a vehicle passenger cabin floor, or a vehicle center console.

11. A vehicle center console assembly, comprising:
    a center console element; and
    an armrest assembly associated with the center console element, the armrest assembly comprising:
       an armrest element; and
       a floating support assembly configured for selectively pivoting the armrest element, the floating support assembly including two vertically translatable support arms each respectively pivotally attached to an opposed end of the armrest element and each including at least one retaining notch.

12. The armrest of claim 11, wherein the two vertically translatable support arms are operatively supported by a resilient member.

13. The armrest of claim 11, wherein the two vertically translatable support arms each include a plurality of vertically stacked retaining notches.

14. The armrest of claim 13, further including a retainer configured to releasably engage the plurality of vertically stacked retaining notches of at least one of the two vertically translatable support arms.

15. A vehicle including the center console assembly of claim 11.

* * * * *